United States Patent Office 2,904,967
Patented Sept. 22, 1959

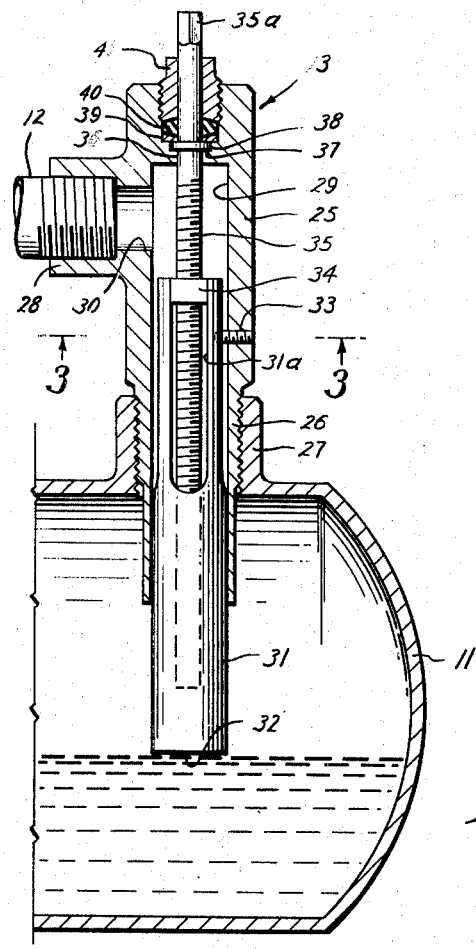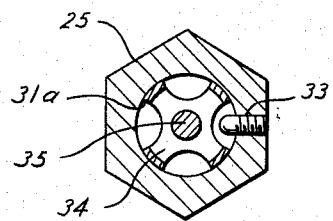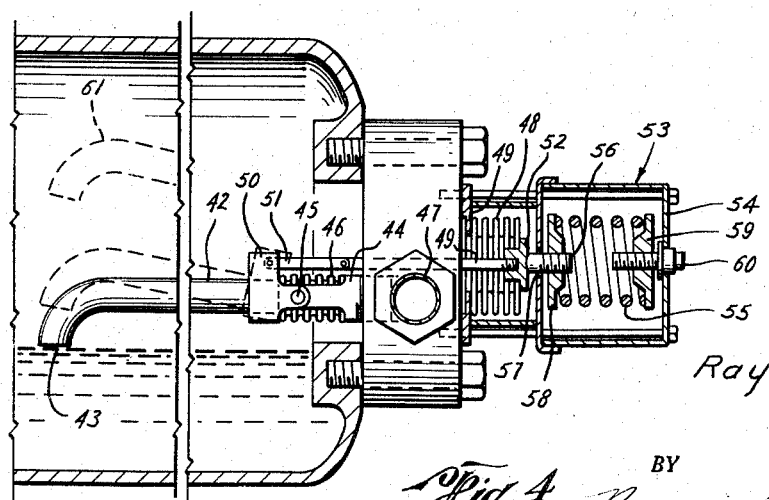

2,904,967

REFRIGERATION SYSTEM AND APPARATUS HAVING A HEATING CYCLE AND A COOLING CYCLE AND METHOD OF CONTROLLING THE HEATING CYCLE

Ray M. Henderson, El Reno, Okla.

Application April 7, 1955, Serial No. 499,912

6 Claims. (Cl. 62—81)

This invention relates to refrigeration systems of the type having a heating cycle and a cooling cycle, and more particularly to control of the pressures of the various portions of the system during the heating cycle by control of the level of the liquid-gas interface in the receiver of the system.

Refrigeration systems providing for both heating and cooling by evaporative processes are quite old, and their use has in general been found to be satisfactory in high temperature applications such as cooling and heating of dwellings or refrigerating and defrosting evaporators which are used for refrigerating storage rooms in which temperatures are normally held above freezing. However, in low temperature applications such as freezing equipment used in the frozen food industry the heating cycle has not been satisfactory. This has been due, at least in part, to the use of conventional means for controlling the evaporation of refrigerant during the heating cycle, such as expansion valves and other metering devices. These devices, although very efficient in the normal operation of the system, are entirely inadequate during the heating cycle of the system for the purpose of heating or defrosting the refrigeration evaporator, especially where temperatures on the order of zero degrees Fahrenheit or less are maintained.

The reason that conventional means for evaporation control such as expansion valves will not operate satisfactorily during the heating cycle is because all such devices are designed to operate under entirely different conditions from those encountered during the heating cycle. These metering devices are necessarily engineered to operate with wide pressure differences between the high and low side of the refrigeration system, and therefore are designed to create a big pressure drop from one side of the valve to the other. This reduction of pressure at the expansion valve is necessary in the refrigeration cycle of conventional systems because of the usual high temperature and relatively high pressure at which the refrigerant is condensed with the resulting high pressure in the liquid receiver, and the necessary low temperature and corresponding low pressure at which the refrigerant is evaporated.

During the heating cycle, pressure conditions are entirely different. During this cycle, the refrigerant is condensed in the evaporator and because of the usual low temperature of the evaporator especially in the range of zero degrees Fahrenheit and less, the refrigerant is condensed at extremely low temperatures with resulting low pressure. This low pressure is reflected in the receiver into which the liquid refrigerant is fed from the evaporator. The liquid under this low pressure condition must be fed into an evaporator which may be the condenser of the cooling system or may be an auxiliary evaporator. Wide pressure differences between the receiver and this evaporator are neither desired nor possible and the conventional means of evaporation control, that is, metering flow from the receiver into this evaporator in response to a wide pressure differential, becomes very impractical because of the slow rate of transmission of refrigerant under the low operating pressure conditions encountered.

An unusual condition which is encountered in reversed cycle heating is the extreme drop in head pressure of the compressor below the receiver pressure at the start of the heating cycle. This pressure difference is created by the extremely rapid absorption of heat in the refrigeration evaporator in which the refrigerant is condensed during the heating cycle. It is customary to provide a check valve in the liquid line to permit liquid to by-pass the conventional expansion valve during the reverse cycle. Due to the relatively high pressure in the receiver as compared to the head pressure and low pressure in the refrigeration evaporator, this check valve will not open and precludes the passage of liquid refrigerant from the evaporator into the receiver until the receiver pressure has been reduced by evacuating a substantial portion of the refrigerant therein. Conventional expansion valves are provided with very small orifices and where an expansion valve is used to control evaporation of refrigerant during the heating cycle an excessive amount of time is required to reduce the receiver pressure through this expansion valve.

It is an object of this invention to provide a means and method of control of liquid supply for evaporation during the heating cycle of a refrigeration system which is not subject to the objectional features of the metered systems pointed out hereinabove.

Another object is to provide a new and novel system and method of control of evaporation of refrigerant during the heating cycle of refrigeration systems which controls evaporation of refrigerant by controlling the level of the liquid-gas interface in the receiver of the system and in which the desired level of the interface may be adjusted to accommodate different charges of refrigerant.

Another object is to provide means and method of regulation and control of evaporation of refrigerant during the heating cycle of such a system which means and method are efficiently operable under pressure conditions encountered during the heating cycle.

Another object is to provide means for transmitting liquid refrigerant from a receiver to an evaporator of a reverse cycle system during the heating cycle without causing any substantial pressure difference between the receiver and the evaporator except that required to force the liquid refrigerant through an uncontrolled passageway between the receiver and evaporator, and to control the transmission of said liquid by adjustment of said means.

Another object is to control the rate of evaporation of a refrigeration system during the heating cycle by regulating the height of the liquid-gas interface in the receiver relative to the amount of refrigerant in the system.

Another object is to transmit refrigerant, either liquid or gases, from the receiver to the heating cycle evaporator of a reverse cycle system through an open and uncontrolled passageway while controlling the respective amounts of either gas or liquid transmitted from the receiver to the evaporator, proportionate to the requirements of the system.

Another object is to provide in a refrigeration system having a heating cycle and a cooling cycle, means and method of maintaining the pressure in the system at a desired value during the heating cycle by controlling the quantities of gas or liquid refrigerant expelled from the receiver during the heating cycle in response to a condition of the system.

Another object is to provide in a refrigeration system having a heating cycle and a cooling cycle, means and method of maintaining the pressure in the system at a desired value during the heating cycle by controlling the quantities of gas or liquid refrigerant expelled from the receiver during the heating cycle in response to a condition of the system in combination with means for selecting or changing at any time the pressure to be maintained.

Another object is to provide a refrigeration apparatus of the compressor type in which flow of refrigerant is not restricted by metering valves or the like and in which the amount of liquid refrigerant transmitted to the evaporator is regulated by controlling the liquid level in the receiver.

Another object is to provide apparatus and method of operating a refrigeration system in which a greater amount of refrigerant is made available for use upon initiation of the heating cycle than is used after pressures have become stabilized in the system.

Another object is to provide a refrigeration system in which the passageway between the receiver and evaporator is not restricted in any manner and the liquid level in the evaporator is controlled by so relating the amount of refrigerant in the system and the height of the receiver outlet that a predetermined amount of liquid refrigerant will be retained in the receiver.

Other objects, features and advantages of the invention will become apparent from the following description and claims taken in connection with the accompanying drawings.

In the drawings wherein there is shown by way of illustration two illustrative embodiments of my invention, one employing manually adjustable means for controlling the liquid-gas interface in the receiver and the other employing automatic means for controlling this interface and wherein like reference numerals indicate like parts:

Fig. 1 is a schematic view of a reverse cycle refrigeration system embodying this invention;

Fig. 2 is a view in vertical cross-section on a greatly enlarged scale of a fragment of the receiver of Fig. 1 and illustrating the manually adjustable receiver outlet employed in the Fig. 1 embodiment;

Fig. 3 is a view in cross-section along the lines 3—3 of Fig. 2; and

Fig. 4 is a view in vertical cross-section through a portion of a receiver such as the receiver of Fig. 1 and illustrating a modified form of receiver outlet which may be substituted for the form of Figs. 1 and 2 and wherein the adjustment of the outlet vertically within the tank is accomplished automatically in response to a condition of the refrigerant and wherein means are provided for biasing the outlet downwardly with a selected force.

Referring to the drawings, it will be noted that the reverse cycle refrigeration system shown in Fig. 1 is conventional except that instead of connecting the condenser to the receiver through an expansion valve or the like an open unrestricted conduit 12 extends between the condenser 10 and receiver 11. An adjustable receiver opening indicated generally at 13 is installed in accordance with this invention and determines the liquid-gas interface of the refrigerant 14 within receiver 11 in accordance with this invention.

The system illustrated in Fig. 1 comprises a conventional refrigeration evaporator 15 which extracts heat from the surrounding area during the cooling cycle. A compressor 16 is connected to evaporator 15 through a suction line 17. The high side of the compressor is connected to evaporator 15 through condenser 10, receiver 11 and a liquid line 18 in the order named. An expansion valve 19 is provided in liquid line 18 and functions during the cooling cycle in the usual manner. Valve 19 must be by-passed during the heating cycle and a by-pass line 20 connected to liquid line 18 on either side of valve 19 is provided. A check valve 21 is positioned in by-pass line 20 to permit refrigerant to flow through the by-pass line during the heating cycle only.

To switch from heating cycle to cooling cycle or vice versa, some manner of reversing flow of refrigerant in the system must be provided. In the system illustrated this is accomplished by a reversing valve indicated schematically at 22. Valve 22 may be operated either manually or automatically.

In some designs it may be found that sufficient heat will be absorbed by the refrigerant during the heating cycle while the refrigerant is in the liquid line 18 and receiver 11 to provide the necessary amount of vapor in receiver 11. Where this is not the case, a heat exchanger 23 may be provided in the liquid line for the purpose of expanding liquid refrigerant during the heating cycle to maintain the desired amount of vapor within receiver 14.

During the cooling cycle refrigerant is circulated in the usual manner in which the refrigerant is evaporated in evaporator 15, vapors pass through suction line 17 to compressor 16 from whence they are passed into condenser 10. Vapors are condensed in condenser 10 and discharged into receiver 11 where refrigerant is accumulated for recirculation through the system as it is needed. System pressure will, of course, be induced by compressor 16 and flow of refrigerant through the evaporator 15 will be controlled by expansion valve 19 in the usual manner.

In reverse or heating cycle operation, valve 22 reverses flow of refrigerant through the system so that hot gas leaving compressor 16 flows through suction line 17 into evaporator 15 where it is condensed due to the extreme low temperature of the evaporator 15. Condensed refrigerant will then pass through liquid line 18 and heat exchanger 23 where it will be warmed so as to permit vaporization to maintain the desired amount of vapor within receiver 14. The receiver will also act as a heat exchanger to some extent to supply heat to the refrigerant to permit vaporization. Refrigerant flows from the heat exchanger 23 through receiver 14, receiver outlet 13 and line 12 to condenser 10 which during the reverse cycle functions as an evaporator. It will be understood that while it is preferred to use the condenser 10 as an evaporator during the heating cycle that this function might be accomplished by using a secondary evaporator and suitable valving arrangement such as shown in my copending application Serial No. 284,730, filed April 28, 1952, now Patent No. 2,763,130, for "Hot Gas Defrosting System." As condenser 10 is in fact an evaporator during the heating cycle it will be referred to interchangeably as a condenser during the cooling cycle or as an evaporator or condenser-evaporator during the heating cycle. Refrigerant is boiled in condenser 10 and is sucked into compressor 16 through line 24 interconnecting the heating cycle evaporator and the compressor.

Because the use of expansion valves or the like to control flow of liquid refrigerant through the passageway between the receiver and condenser-evaporator is not practical as previously explained, my invention includes means for controlling the liquid-gas interface within the receiver which will determine the quantity of liquid transmitted to the condenser-evaporator 10 from the receiver during the heating cycle and hence the amount of liquid within the condenser-evaporator 10. It is desirable to flood this evaporator to obtain maximum efficiency, but over-flooding cannot be permitted due to the deleterious effect of liquid refrigerant on compressor 16. As illustrated in the drawings, this may be accomplished by providing a receiver outlet indicated generally at 13, which because of its elevation limits the amount of liquid that can be conducted from the receiver to the condenser.

Referring now to the receiver outlet during the heating cycle indicated generally at 13, it will be seen to comprise a fitting 25 having a male end fitting 26 received in boss 27 in the upper portion of receiver 11 and an angularly arranged female end fitting 28 in which conduit 12 is threadedly received. Fitting 25 has right angular bores 29 and 30 which intersect at one end and terminate in the end fitting 26 and 28, respectively. A sliding conduit or stem 31 is positioned within bore 29 for axial movement therein. As the fitting 13 is mounted on the top of the receiver, this axial movement will be vertical with respect to the receiver 11 to move the open end 32 of the conduit toward or away from the bottom of receiver 11. Conduit 31 has a close sliding fit within bore 29 to prevent any substantial leakage between the stem and bore. If desired, a suitable sliding seal element of resilient material may be utilized to further effect this seal as will be understood by those skilled in the art. The upper end of conduit 31 is slotted as at 31a to receive one or more pins 33 which project from the wall of bore 29 to prevent rotation of conduit 31 while permitting axial movement of the conduit. The upper end of conduit 31 is provided with a spider or nut 34 which is threaded on elongate bolt 35 which extends into bore 29. The threaded bolt 35 extends through a bore 36 in the end of fitting 25 opposite male end fitting 26. A counterbore 37 is provided directly above bore 36 and threaded bolt 35 carries a radial flange 38 which rests in this counterbore to prevent downward movement of bolt 35. A still further counterbore 39 is provided above counterbore 37 and a packing 40 and a gland 41 are received within counterbore 39 to hold flange 38 within counterbore 37 and to prevent leakage of refrigerant past bolt 35. From the foregoing explanation it is believed apparent that rotation of bolt 35 by a suitable wrench applied to wrench part 35a will raise or lower the conduit or stem 31 and hence receiver outlet 32 depending upon the direction of rotation of bolt 35.

During the cooling cycle receiver pressure will be high and the level of the liquid-gas interface in receiver 11 will normally be above outlet 32 as indicated in Fig. 1. At the instant of reversing cycles, this pressure will be released by the interconnection of receiver 11 and evaporator 15 through condenser-evaporator 10. Evaporator 15 is so cold that all vapors from condenser-evaporator 10 are immediately condensed and pressure within the evaporator may be reduced to a vacuum. All liquid refrigerant above receiver outlet 32 will be evacuated from receiver 11 first. Then excess gas within receiver 11 will be evacuated until receiver pressure is less than the pressure in evaporator 15. Check valve 21 will now open and normal circulation induced by compressor 16 will commence. As liquid refrigerant is fed from evaporator 15 into receiver 11, it is believed that the liquid level in receiver 11 rises slightly above receiver outlet 32. Vaporized refrigerant in receiver 11 then forces this excess liquid out through outlet 32. Any excess vapor pressure will then follow the liquid out outlet 32. While removal of liquid and gas from receiver 11 seems to be alternately accomplished, the two processes are so closely associated and occur at such short intervals that no fluctuations of pressures or variations in operation are noticeable in actual operation of the system and the supply of liquid to condenser-evaporator 10 is, from an operational standpoint, substantially constant.

From the above, it will be seen that an amount of liquid refrigerant equal to that in receiver 11 below the level of receiver outlet 32 will always be present in receiver 11 during the heating cycle. Thus, by lowering receiver outlet 32, the liquid-gas interface in receiver 11 will be lower and the volume of liquid in condenser-evaporator 10 will be decreased. Raising of outlet 32 will have the opposite result. In other words, the amount of refrigerant in the system and the height of the receiver outlet should be so related as to provide the desired amount of liquid in evaporator 10. This may be done by fixing the outlet 32 at a particular level and employing a charge of refrigerant which will provide the desired volume of refrigerant during the heating cycle with the outlet at such level, or by adjusting the height of the outlet to accommodate any particular amount of charge.

In single evaporator systems or self-contained units where the return of liquid to the receiver is fairly constant and where the possibility of leaks and the necessity of adding refrigerant is minimized, the receiver outlet 32 may be fixed and a predetermined amount of refrigerant charged into the system. This amount should be such that when system pressures have stabilized the evaporator 10 will be flooded the desired amount. However, in large or multi-evaporator systems (cooling evaporators) wherein temperature variations and other inherent conditions might materially effect the return of liquid and in which the necessity of adding refrigerant might occur quite often, this method of liquid supply for evaporation is not recommended as the average refrigeration serviceman is seldom equipped with either experience or the necessary tools to critically charge a refrigeration system.

Regulation of the quantity of liquid removed from the receiver regulates the quantity of liquid transmitted to the condenser-evaporator 10 and thereby regulates the amount of boiling liquid being evaporated in the condenser-evaporator as explained above. Because the amount of liquid refrigerant in the condenser-evaporator 10 determines the amount of available heat exchange surface of the condenser-evaporator that is used, other than as a superheater, which in turn determines the rate of evaporation of refrigerant, it is evident that by adjustment of the height of the receiver outlet that the evaporator rate or suction pressure can be changed.

To attain this optimum result, a pressure gauge would be inserted in the suction side of the compressor 16 with the system operating on the heating cycle and the height of stem 31 adjusted to obtain the maximum suction pressure attainable in the system without causing liquid refrigerant to be fed into the compressor. This adjustment will, of course, be made after the system is charged and hence the amount of charge is not critical but may be compensated for by the positioning of stem 31.

Another function of the adjustable receiver outlet is the control and regulation of the operating pressures of the refrigerant throughout the entire system during reverse cycle operation. Referring to Fig. 1, liquid refrigerant, being heavier than the vapor generated therefrom, normally accumulates in the bottom of the receiver and it is, therefore, evident that forceful means must be employed to transmit this liquid to a higher level (into the condenser-evaporator 10). Because of the fact that the receiver of a refrigeration system is usually positioned at a lower level than the condenser, gas pressure contained above the liquid in the receiver is customarily employed for this purpose.

As there is no restriction to the flow of refrigerant between the receiver 11 and condenser-evaporator 10, the amount of liquid transmitted from the receiver to the condenser during the heating cycle is dependent upon the amount of pressure above the liquid in the receiver, and because the flow of refrigerant throughout the entire system is dependent upon the difference of pressures therein, the control and regulation of the pressure generated in the condenser-evaporator 10 is essential to the maintenance of proper pressures in the other parts of the system. Without adequate pressure in the receiver to lift liquid refrigerant to a height required for an adequate supply of expanded gas, the entire reverse cycle operation would be adversely effected as inadequate receiver pressure would result in reduced suction pressure and consequently a reduced volume of hot gas transmitted to the evaporator 15.

Because of the amount of heat required for defrosting low temperature evaporators, a large volume of hot gas must be transmitted by the compressor to the evaporator to thereby maintain as high a pressure as possible in the evaporator that is being defrosted. The pressure thus maintained is influenced by two factors, one of which is the volume of hot gas transmitted thereto, and the other is the pressure resistance encountered in the transmission of refrigerant from the evaporator 15 to the receiver 11 through liquid line 18. Therefore, by increasing or decreasing either or both of these factors the operating efficiency of the heating cycle may be changed.

It will be apparent that by adjusting receiver opening 32 in a downwardly direction, the pressure requirements for lifting liquid refrigerant from the receiver to the condenser will be increased, and by the resulting increase in receiver pressure the resistance to the return of refrigerant from the evaporator to the receiver will be increased thereby resulting in an increase of pressure in the evaporator being defrosted. Downward adjustment of receiver opening 32 also increases suction pressure which will contribute to maintaining a high pressure in evaporator 15. It will also be apparent that adjustment of this receiver outlet in an upwardly direction would have exactly an opposite effect and would consequently cause a reduction of pressures in all parts of the system.

From the foregoing it is evident that the liquid level and pressures in the evaporator 15, the receiver 11 and condenser-evaporator 10 are interrelated. Taking these related factors into consideration an automatic adjusting means, responsive to the pressure of the refrigerant may be provided for adjustment of the level of the receiver outlet.

Referring now to the modified embodiment shown in Fig. 4 of the drawings, the adjustable receiver outlet tube 42 is provided with a downwardly facing open end 43 and has its other end flexibly connected to an outside conduit connection 44. This flexible leak-tight connection may be provided by pivotably mounting tube 42 at one end as at 45 and interconnecting tube 42 and outlet 44 by a bellows 46. Outlet 44 is angled immediately adjacent its connection with bellows 46 and terminates in an end fitting 47 to which conduit 12 may be connected. Power for vertical movement of tube 42 about pivot 45 is provided by a bellows 48 which is sealingly secured at one end to the receiver as at 49 to expose the interior of the bellows to receiver pressure. The other end of bellows 48 is closed and connected to a connecting rod 49 which is secured to a crank arm 50 on tube 42 by a pivoted linkage 51. The exterior of bellows 48 is exposed to the outside pressure and the differential between pressure within and without the receiver will cause movement of tube 42.

The free end 52 of bellows 48 is biased against receiver pressure by a biasing means indicated generally at 53. This biasing means includes a cage 54 in which there is mounted a compression spring 55 which bears upon bellows closure 52 through a pin 56 slidable in a guideway 57 in cage 54. Pin 56 is secured to a spring carrier 58 against which one end of spring 55 bears. The other end of spring 55 bears against a spring carrier 59 which is carried by a screw 60 which is mounted for rotation in cage 54 and held against axial movement therein. Screw 60 is threadedly received within spring carrier 59 and the magnitude of compression of spring 55 is varied by movement of spring carrier 59 along screw 60.

The operation of the system employing the modified receiver outlet of Fig. 4 will now be explained. At the instant of switching cycles from cooling to heating, the pressure within receiver 11 will be very great and due to the unbalanced force condition across bellows 48, the receiver outlet 43 will be in its highest position as indicated by the dotted line showing of tube 42 at 61. The evaporator 15 will be at a much lower pressure. As hot gases are fed into the evaporator and immediately condensed due to the extremely cold temperature thereof, the pressure within the evaporator will be at a very low figure and in some instances may reach several inches of vacuum. At the instant of changing of cycles, the pressure within receiver 11 will begin exhausting all vapor above the liquid in receiver 11 through receiver outlet 43 until the pressure within receiver 11 is equal to the outside pressure plus the force exerted by spring 55. At this point, the free end of bellows 48 will be in equilibrium. However, a large amount of liquid refrigerant remains in the receiver and, therefore, the liquid level within the condenser-evaporator 10 will be lowered by evaporation, and receiver pressure will be reduced. The spring 55 will be exerting a force which added to the ambient pressure will be sufficient to lower the outlet into the liquid to maintain the condenser-evaporator 10 at its nearly flooded condition (approximately ⅘ of its capacity). It will be remembered that at this time the pressure within the receiver is equal to that exerted by the outside pressure and the spring. Thus, the pressure within the receiver is in excess of that required to maintain the low liquid level within the condenser-evaporator. This being so, a portion of this excess pressure will escape through the liquid outlet 43. This will result in an unbalancing of the force condition across bellows 48 and a lowering of liquid outlet 43. The pressure within receiver 11 will still be greater than that necessary to support the liquid within the condenser-evaporator at this time and this pressure will force the liquid now above the new level of outlet 43 into the condenser-evaporator 10. This cycle will be repeated until the condenser-evaporator 10 is flooded to the extent determined by the setting of spring 55 at which time the pressure within receiver 11 will be just sufficient to maintain the desired amount of liquid refrigerant in the condenser-evaporator 10. It might be stated that the cycle of events explained above will occur very rapidly. The pressure within evaporator 15, however, will still be less than the pressure within receiver 11 at this stage of the cycle. Thus, check valve 21 will be closed and there will be no return of liquid from evaporator 15 to receiver 11. The boiling liquid within condenser-evaportor 10 will continue to feed hot vapors to the evaporator where they are condensed. As liquid is boiled off, the amount of liquid within condenser-evaporator 10 will decrease and the pressure within receiver 11 will be in excess of that necessary to maintain the reduced amount of liquid within the condenser-evaporator 10. This excess pressure will escape through outlet 43, and outlet 43 due to unbalancing of the free end of bellows 48 will again drop to below the liquid-gas interface in receiver 11. Due to heat exchange between the skin of the receiver and the surrounding atmosphere, the liquid refrigerant within receiver 11 will be continuously evaporating and the pressure within the receiver will quickly rise to an amount in excess of that necessary to maintain the reduced amount of liquid within condenser-evaporator 10 and this excess pressure will eject the liquid which is above the newly assumed level of outlet 43. Stated another way, the pressure within the receiver will continuously attempt to maintain a high liquid content within the condenser-evaporator 10. In doing so, the liquid outlet 43 will be lowered and the liquid within receiver 11 will be gradually fed into the condenser-evaportor 10 to replenish the boiled off vapors.

Considered in another light, the apparatus of Fig. 4 is a pressure relief valve for maintaining a differential in pressure between receiver 11 and the top of condenser-evaporator 10. The pressure differential so maintained will support a certain volume of liquid refrigerant in condenser-evaporator 10 for evaporation. However, it is preferred that bellows 48 be exposed on one side to atmospheric pressure instead of the top of evaporator-condenser 10 because this will result in a higher liquid level in evaporator 10 during the initial portion of the heating cycle. The above is true because before circulation begins the liquid level in evaporator 10 will be lowered due to evaporation as explained hereinabove. As the liquid level lowers, the efficiency of the evaporator 10 will be reduced and the pressure in the top of the evaporator will be reduced. Thus, the differential in pressure between the receiver and evaporator 10 will increase permitting the pressure within the receiver to support a greater volume of liquid in evaporator 10 than would be possible if the differential between the receiver 11 and evaporator 10 were constant.

In the manner explained above, the liquid within the receiver will be made available for boiling in the condenser-evaporator until the boiled off vapors have been supplied in sufficient quantity to build up a pressure within evaporator 15 which exceeds the pressure within receiver 11. When this occurs, check valve 21 will open and normal circulation will commence. As liquid is fed from evaporator 15 into receiver 14, the liquid level and pressure within receiver 11 will be increased. The increased pressure will tend to raise receiver outlet 43 which will permit raising of the liquid level within receiver 11. As pressure is continuously built up within the receiver, the receiver outlet 43 will slowly rise until the pressure within the evaporator 15 has become static resulting in more or less static pressure within the receiver 11. At this time, the receiver outlet will be positioned at a point which will maintain the volume of liquid refrigerant in condenser-evaporator 10 at an amount determined by the amount of compression of spring 55.

From the above, it is believed apparent that the adjustment of the liquid-gas interface with this form of the invention is in response to a condition of the system— i.e., directly responsive to the pressure within the receiver and indirectly responsive to the pressure in the top of condenser-evaporator 10 and to the pressure within evaporator 15. It is believed apparent that the adjustable receiver outlet will maintain the amount of liquid refrigerant in condenser-evaporator 10 at a level which will result in maximum operating efficiency both during the initial moments of the heating cycle and after the pressures within the system have become stabilized.

From the means and method disclosed herein, it is believed to be obvious that in the heating cycle of refrigeration systems control and regulation of evaporation and/or suction pressure is essential and that conventional evaporator control means such as expansion valves are inadequate for such control and regulation. It is believed to be further obvious that the evaporator and/or suction pressure of a heat cycle of the type disclosed can be controlled by the control of the pressure difference between the receiver and the heating evaporator, and that this control can be accomplished by control of the liquid level in the receiver during the heating cycle.

From the foregoing it will be seen that this invention is one well adapted to attain all of the ends and objects hereinabve set forth, together with other advantages which are obvious and which are inherent to the apparatus, system and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a compression refrigeration system of the type employing a receiver for storing liquid refrigerant and having a cooling cycle and a heating cycle in each of which liquid refrigerant is fed from the receiver into an evaporator together with means for switching cycles, the improvement which resides in the combination therewith of a conduit extending into the receiver and providing an outlet for the receiver through which refrigerant is fed to the evaporator downstream thereof during the heating cycle, said conduit having its open end positioned below the top of the receiver and determining the level of the liquid-gas interface in the receiver, and means for automatically regulating the height of the open end of said conduit in response to a condition of the system to regulate the suction pressure of the system.

2. In a refrigeration system having a compressor with its low side normally connected to a refrigeration evaporator through a suction line and its high side normally connected to said evaporator through a receiver and liquid line, means providing for reverse cycle operation of the system to reverse flow of refrigerant in the system and heat the evaporator, a second evaporator interconnecting the receiver and the low side of the compressor during reverse cycle operation, the connection between the receiver and second evaporator including a conduit extending into the receiver with its open end below the top of the receiver and determining the level of the liquid-gas interface in the receiver, and means for automatically regulating the height of the open end of said conduit in response to a condition of the system to regulate suction pressure of the system.

3. In a refrigeration system having a compressor with its low side normally connected to a refrigeration evaporator through a suction line and its high side normally connected to said evaporator through a condenser, receiver and liquid line respectively, means providing for reverse cycle operation of the system to reverse flow of refrigerant in the system and heat the evaporator, the means connecting the condenser and receiver including a conduit extending into the receiver with its open end below the top of the receiver and determining the level of the liquid-gas interface in the receiver during reverse cycle operation, and means regulating the level of the open end of said conduit in response to receiver pressure.

4. In a refrigeration system having a compressor with its low side normally connected to a refrigeration evaporator through a suction line and its high side normally connected to said evaporator through a receiver and liquid line, means providing for reverse cycle operation of the system to reverse flow of refrigerant in the system and heat the evaporator, means interconnecting the receiver and the low side of the compressor during reverse cycle operation including a second evaporator and a passageway interconnecting the receiver and second evaporator, and means responsive to receiver pressure for controlling the respective amounts of either gas or liquid transmitted from the receiver to said second evaporator reverse cycle operation, said amounts transmitted being proportionate to the requirements of the system during reverse cycle operation.

5. The method of reverse cycle operation of a refrigeration system to heat the refrigeration evaporator in which return of liquid refrigerant from the evaporator to the receiver is prevented until pressure within the evaporator exceeds pressure in the receiver comprising, initiating the reverse cycle by first removing vaporous refrigerant from the receiver to relieve excess pressure therein, then supplying liquid and vaporous refrigerant from the receiver to a heat exchanger for supplying heat to the system in amounts necessary to maintain a predetermined suction pressure on the system until the liquid in the receiver is reduced to a low level and the pressure in the evaporator exceeds the pressure in the receiver, and then circulating refrigerant in the system while maintaining the predetermined suction pressure and accumulating excess refrigerant in the receiver.

6. An accumulator for a refrigeration system comprising, a vessel for use with a reverse cycle refrigeration system for accumulating liquid refrigerant during the refrigeration cycle and trapping out a predetermined amount of liquid refrigerant during the heating cycle, a first opening into the vessel adjacent the bottom thereof for supplying liquid refrigerant to a liquid line during refrigeration cycle and receiving liquid refrigerant from the liquid line during the heating cycle, and a second opening into the vessel spaced above the first opening for receiving liquid refrigerant from a heat exchanger during the refrigeration cycle and for supplying liquid refrigerant to a heat exchanger during the heating cycle, said second opening spaced above the bottom of the vessel a predetermined distance to trap within the vessel a predetermined amount of liquid refrigerant below the second opening during the heating cycle.

References Cited in the file of this patent

UNITED STATES PATENTS

| | | |
|---|---|---|
| 1,823,899 | Hull | Sept. 22, 1931 |
| 2,147,508 | Troup | Feb. 14, 1939 |
| 2,276,814 | Zwickl | Mar. 17, 1942 |
| 2,525,560 | Pabst | Oct. 10, 1950 |
| 2,589,855 | Pabst | Mar. 18, 1952 |
| 2,604,761 | Atchison | July 29, 1952 |
| 2,607,200 | Shoemaker | Aug. 19, 1952 |